Jan. 17, 1967     T. G. STASTNY     3,298,465

ENERGY ABSORBING ARRANGEMENT

Filed Oct. 22, 1964     4 Sheets-Sheet 1

Theodore G. Stastny
INVENTOR

ATTORNEY

Jan. 17, 1967     T. G. STASTNY     3,298,465
ENERGY ABSORBING ARRANGEMENT

Filed Oct. 22, 1964     4 Sheets-Sheet 2

Theodore G. Stastny
INVENTOR

BY
ATTORNEY

Jan. 17, 1967     T. G. STASTNY     3,298,465
ENERGY ABSORBING ARRANGEMENT

Filed Oct. 22, 1964     4 Sheets-Sheet 3

Theodore G. Stastny
INVENTOR

ATTORNEY

Jan. 17, 1967  T. G. STASTNY  3,298,465
ENERGY ABSORBING ARRANGEMENT
Filed Oct. 22, 1964  4 Sheets-Sheet 4

Theodore G. Stastny
INVENTOR

BY
ATTORNEY

United States Patent Office 3,298,465
Patented Jan. 17, 1967

3,298,465
ENERGY ABSORBING ARRANGEMENT
Theodore G. Stastny, Baltimore, Md., assignor to AAI Corporation, Cockeysville, Md., a corporation of Maryland
Filed Oct. 22, 1964, Ser. No. 405,690
13 Claims. (Cl. 188—1)

This invention relates to energy absorbing devices and methods, and more particularly to an energy absorbing buffer cup arrangement and method of manufacture and a corollary method of energy absorption.

In various devices or systems it is often desirable to absorb the kinetic energy of one or more moving masses with respect to another mass. One previous arrangement for effecting this energy absorption has employed a continuous wall buffer cup and a piston, the piston being of smaller diameter than the buffer cup and causing reverse draw deflecting moveemnt of the cup end wall and side walls by piston movement against the end wall toward the open end of the cup. These conventional buffer cups are often entirely satisfactory for large forces, under both impact and static loads, but the design of such cups to buffer small static or impact forces, or the design variation of buffered load response for a given cup size and wall thickness, presents serious and often insurmountable problems. For instance, to reduce the energy absorbing action of a cup of a given diameter and length, for a given energy absorption stroke of the piston, requires that the thickness of the continuous cup wall be decreased by a corresponding factor. This reduction in wall thickness can be carried only so far for practical purposes with available ductile materials, for when one reduces the thickness to that approaching foil thickness the ability of the wall to withstand buckling and crumpling becomes substantially nil, and buffer action in the manner described is destroyed. In such instance even such buffering as does take place becomes highly erratic and unpredictable. The general concept of employing a buffer cup and piston arrangement is, however, of such advantages in many instances that it is desirable to employ this type of arrangement, if possible, even in low load situations.

It is accordingly a major object and feature of this invention to provide a buffer cup and piston arrangement and method of buffering which will permit the absorption of energy at a given selectively desired rate or level, and for a selected quantity of energy over a given stroke, and particularly in the range of load levels lesser than those heretofore possible with buffer cup arrangements of similar thickness, diameter and stroke.

Still another feature of the invention is the provision of a buffer cup energy absorption arrnagement and method of energy absorption which enables the selective variation of rate of absorption of kinetic energy over a wide range, without requiring any substantial general size changes for the energy absorption arrangement.

Still other objects, features and attendant advantages will become apparent to those skilled in the art from a reading of the following detailed description of several physical embodiments and modes of practice in accordance with the invention, taken in conjunction with the accompanying drawings wherein.

Figure 1:
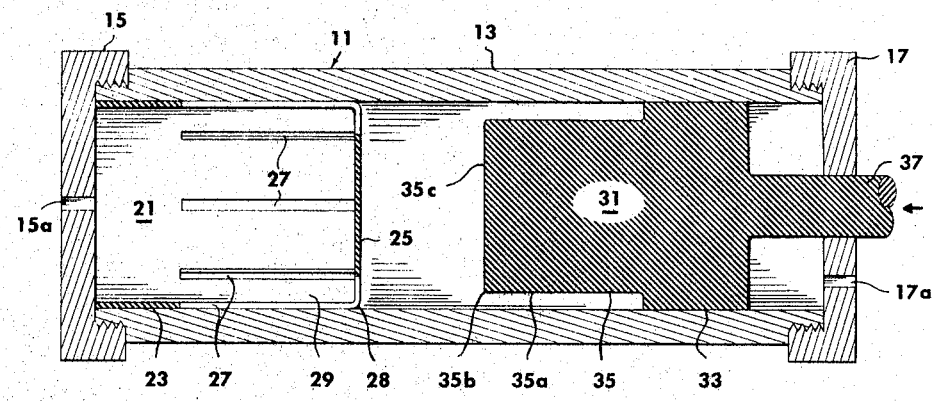
FIGURE 1 is a generally schematic longitudinal section view of a buffer arrangement according to the invention.

Referring now in detail to the figures of the drawings, in FIGURE 1 there is shown an energy-absorbing arrangement according to the invention in the form of a buffer assembly 11 having a cylinder 13 with end caps 15 and 17, the cylinder and end caps enclosing an energy-dissipating slotted buffer cup 21 and a slidably mounted piston 31. The end caps 15 and 17 may be secured to the cylinder 13 in any suitable manner, as by interengaging threads (as shown), screws, bolts, welding, or in any other desired manner. In some instances it may be desirable to eliminate one or both of the end caps 15, 17, in the latter of which case some other mode of anchoring the cup 21 against end movement will be necessary, such as formation of a shoulder stop on the inner annular wall of the cylinder 13 for engagement by the open end of the cup.

Air bleeder orifices 15a and 17a may be provided in the end caps 15 and 17 to prevent air pressure or suction build-up during the energy-dissipating stroke of the piston 31, and thereby preventing any energy storing action which might otherwise result from differential air pressure on the opposite ends of the piston during its stroking action and which energy storing action would normally be undesirable for essentially pure energy absorption devices.

Figure 2:
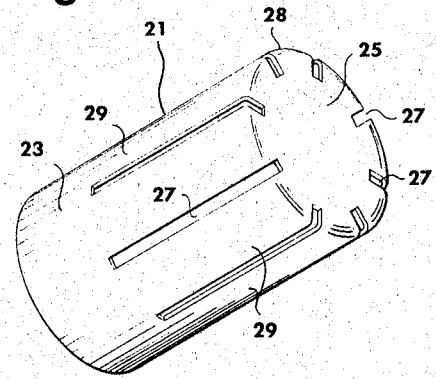
FIGURE 2 is an orthographic view of the buffer cup of FIGURE 1.

As shown more clearly in FIGURE 2, the energy-dissipating buffer cup 21 has a longitudinal tubular side wall 23 bounded by the inner wall of cylinder 13, and an end wall 25 adjacent the piston 31, the side wall 23 and end wall 25 being integrally connected through a smooth curbed bend 28. Longitudinally extending slots 27, which are parallel, equally spaced, and of equal width along their extent in the illustrative embodiment, are formed in the longitudinal side wall 23 and preferably extend through the bend 28 into the end wall 25. These slots 27 may be formed in any suitable manner, as by a saw cut, molding, stamping, etc. The slotted cup 21 thus forms a plurality of arcuate beams or strip columns 29 which are equally spaced from a common center and which are interconnected at their opposite ends, the arcuate beams being pre-bent at 28 to join together through the common end wall 25. The respective widths of the slots 27 and interconnected beams 29 are dependent upon the extent of buffering action desired and may be varied as necessary or desired.

Figure 3:
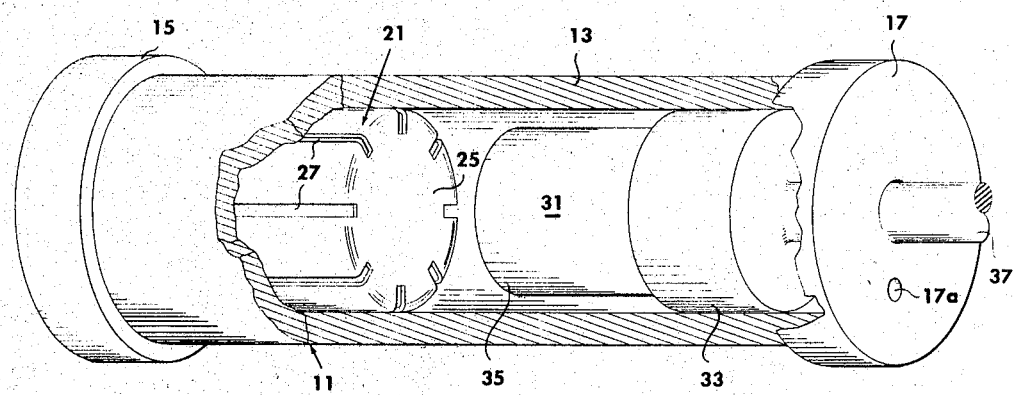
FIGURE 3 is an orthographic view, in partial section, of the arrangement of FIGURE 1.

The annular periphery of the cup 21 is preferably substantially complementary to the corresponding inner bore of the cylinder 13 to enable substantially complete circumferential restraining of the cup wall beams 29 against any material radially outward bending during the buffering stroke of the piston. While in some instances it may be acceptable to permit a visible degree of outward bending of the cup, this is normally undesirable as it reduces the predictability of response of the system, and if permitted beyond a relatively small amount such will often result in load failure and inner buckling of one or all of the arcuate beams 29. In the mounted position of the cup, as shown in FIGURES 1 and 3, the end wall 25 faces the cup-engaging end of the piston 31, and the open end of the cup 21 engages the end cap 15 which acts as an end stop for the cup 21 and serves to transmit the piston-imparted residual load on the cup to the cylinder 13 if the cylinder is the secured or anchored element or the end cap 15 may be directly anchored to one of the relatively moving masses in which case the residual load will be transferred directly through the end cap.

The piston 31 includes an enlarged guide section 33 and a reduced diameter cup-engaging section 35. A push rod section 36 may be suitably formed on or secured to the main body portion of the piston 31 and extends through a complementary opening in the end cap 17. The reduced diameter cup engaging piston section 35 has an annular side wall 35a, an end wall 35c, and an annular radius edge portion 35b smoothly connecting between the side wall 35a and end wall 35c.

It is normally desirable to form the slots 27 such that they extend through the bend 28 and a portion of the end wall 25 of the cup to a radial position of smaller radius from the longitudinal center line of the cup and piston than the radius of the cup-engaging section 35 of piston 31, in order to reduce the reactive force during initial movement of the piston and cup end wall. This, of course, may be omitted where this normally desirable action is not necessary or desirable.

The cup 21 may be formed of any suitable ductile or malleable material which is capable of mechanical deformation through a rolling U-bend with plastic cold flow to a permanent deformation, and preferably without any material energy storage such as might be present in the case of elastic materials such as rubber. Particularly suitable are materials such as aluminum, nickel, copper, and other crystalline materials such as various presently available plastics including nyoln, polyethylene, etc. The presently preferred materials are nickel and aluminum and their alloys.

The general mode of operation of the energy-absorbing arrangement of FIGURES 1–3 is schematically illustrated in FIGURES 4–8. In this connection, it will be appreciated that while the piston 31 is shown spaced from the end wall 25 in FIGURES 1 and 3 for purposes of clarity of illustration, the piston may be started either in this spaced-apart position or may initially be mounted in engagement with the end wall 25 of the cup 21. In any event, the piston 31 is caused to depress the end face 25 of the cup 21 by relative longitudinal movement between the cup 21 and piston 31. This may be effected by holding the cylinder 13 and cup 21 stationary and moving the piston 31 to the left as shown in FIGURES 1 and 3, or by holding the piston stationary and moving the cylinder and cup assembly to the right as shown in this figure, or by moving the cylinder and cup on the one hand and the piston on the other hand such that the cup and piston move toward one another, to cause depression of the end face 25 and in-rolling of the cup as shown in FIGURES 4–7.

Figure 4:
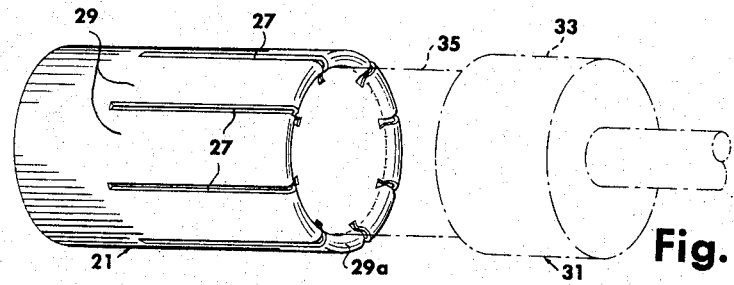
FIGURES 4–7 are schematic views of the buffer cup and piston of FIGURE 1, illustrating the successive positions of these elements during the buffering action.
Figure 5:
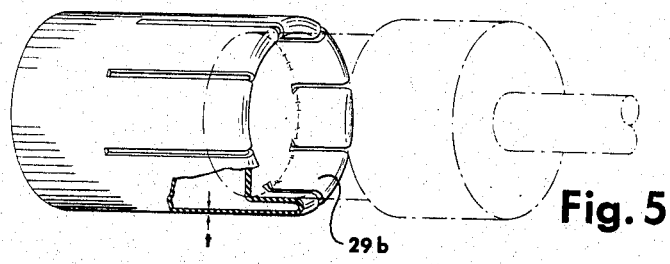
Figure 6:
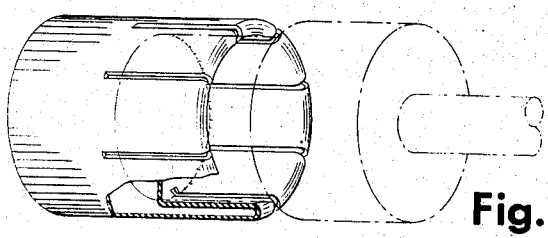
Figure 7:
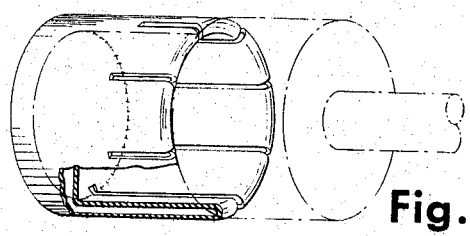

As shown in FIGURE 4, the initial action of the piston 31 is to form a depression in the end wall 25 of the cup 21 through inter-engagement of the cup-engaging section 35 with the end wall. Continued relative movement between the cup and piston causes the original outer wall, formed by the arcuate longitudinal beams or columns, to plastically roll through a substantially 180° U-bend 29a (see FIGURE 8), to a new reversed inner wall configuration indicated at 29b and having a radius $R_2$ substantially complementary to the annular side wall 35a of the piston 31. This simultaneous incremental rolling action of each of the arcuate beams or columns 29 continues through the energy-dissipating stroke of the piston 31. The kinetic energy of the piston and such other mass as may be effecting relative motion between the cup and piston, is absorbed by the plastic cold flow simultaneous arcuate end bending of the beams 29 through the bend 29a and then re-bending of the material to the longitudinally straightened reverse arcuate form indicated at 29b. The range of possible kinetic energy to be absorbed can normally be predetermined, and the cup 21 and piston 31 are normally formed such that the reduced diameter cup-engaging section 35 is of longer length than the cup-engaging stroke necessary for full energy dissipation. Likewise, for desirably uniform energy dissipation the slots 27 are normally formed to a length longer than the stroke of relative movement between the cup 21 and piston 31, as illustrated in the end of stroke position shown in FIGURE 7, although in some instances the stroke may extend beyond all or a portion of the slots as may be desired.

Figure 8:
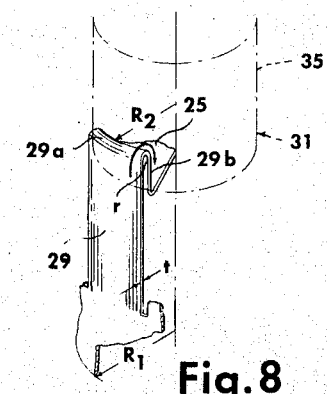
FIGURE 8 is a fragmentary view of a portion of the buffer cup of FIGURES 1–8.

For most satisfactory operation it is desirable, as shown in FIGURE 8, that for a cup of outer radius $R_1$ the cup-engaging section 35 of the piston 31 should have a radius $R_2$ less than the radius $R_1$ by an amount approximately equal to or greater than $4t$, or a total cross-sectional span difference equal to or greater than about $8t$, where $t$ is the thickness of the annular wall 23 of the cup 21, thereby providing a roll radius $r$ at the U-bend 29a of approximately $t$ or greater. Below this range the material tends to crack and tear in the bend 29b. With respect to greater differences between $R_1$ and $R_2$, differences as high as $50t$ have been successfully employed using a four slotted aluminum cup.

It will be readily appreciated by those skilled in the art that while the circumferential compression factor would represent a substantial proportion of the forces resisting the compressive bending action of the piston 31 on the cup end wall in the case of a continuous side wall cup, this factor is substantially reduced to a very small, if not completely negligible, factor, particularly in the embodiments where a large number of slots 27 is formed and where the slots are of greater total width than the difference between the circumferences of the cup outer surface and the piston engaging wall surface 35a. That this is the case will be appreciated when one considers that the difference in cross-sectional span of the outer cup and the inner newly formed cup which would normally be taken up by circumferential compression and increase of wall thickness and axial elongation of the material, is primarily taken up in the present invention by decrease in the width of the slots as the material flows around the U-bend 29a and proceeds to the smaller diameter inner cup shape indicated at 29b. There are, however, in addition to the beam bending reaction forces, some circumferential or arcuate compression forces involved in reversing the concavity of the material from the outer curved shape of the individual arcuate cross-sectional beams to the inner reverse-arcuate configuration, insofar as the material of the individual beam is concerned. The degree of compression forces involved will depend upon the number of slots formed in the particular cup 21, inasmuch as the larger the number of slots the closer the individual arcuate beams 29 approach the cross-sectional configuration of a flat beam, and thereby approach the condition in which the bending through the U-bend 29a can be calculated by a simple conventional beam bending equation.

While it is normally desirable that the total combined width of the slots 27 represent a linear value equal to or greater than the linear difference between the outer circumference of the cup 21 and the inner circumference of the inwardly formed cup indicated at 29b, there may be instances in which it is desirable to form the slots of a lesser total linear width with respect to these circumferences and thereby introduce a desired particular reduced circumferential compressional load response to the axial movement of the piston 31 in addition to the longitudinal bending load response and otherwise relatively smaller circumferential compression response factor.

Figure 9:
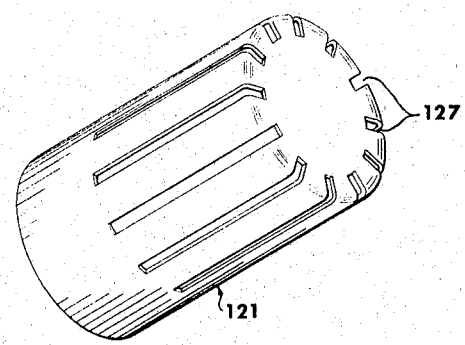
FIGURE 9 is an orthographic view of a modified buffer cup with a greater number of slots formed therein.

The particular quantity, width and configuration of the slots may be varied as desired, such being a function of the particular load response characteristics which are desired for any particular energy-absorbing cup arrangement, it being appreciated that the larger the quantity and greater the total width of the slots the smaller will be the total material in the beams 29 to be worked in the U-bend zone 29a, and the smaller will be the reactive buffering forces for a given cup side wall thickness and cup cross-sectional span. Thus, in the modified cup embodiment of FIGURE 9, in which the total number of slots 127 has been increased from eight in the previously illustrated embodiments to twelve, while retaining approximately the same individual slot width, the total cross-sectional material in the longitudinal beams is decreased by a corresponding factor while the individual beams also approach a more nearly flat cross-sectional configuration, and consequently the buffering reaction force of this embodiment will be reduced by a substantially proportionate amount.

Figure 10:
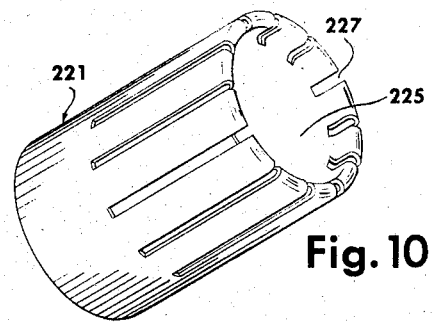
FIGURE 10 is an orthographic view of a further modified form of the buffer cup, employing a predimpled end wall.

In the modified embodiment of FIGURE 10 the cup 221 has been pre-formed with a predimpled end 225. It has been found that this predimpling will cause an earlier build-up of reaction forces to a substantially constant level, while with the embodiments of FIGURES 1–9 which do not employ predimpled ends there is a longer initial stroke of the piston and cup end face required for build-up of the reaction forces to a substantially or nearly constant level. This predimpling can be effected either before or after forming of the slots 227. In the illustrated embodiment of FIGURE 10 the slots have been formed by cutting after predimpling, and are thus of the same width in their initial form in both the outer cup portion and the inner predimpled wall portion, it being noted that the slots extend slightly into the transverse end face of the predimpled portion 225, although in this particular embodiment this is not a necessity. As a matter of fact, it is only necessary that the slots extend through the U-bend portion of the predimpled end, without necessity that they extend down to the transverse end face, as the subsequent reverse bending of the cup 221 by the action of the piston will be effected from this initial condition, and it is only necessary to alleviate or reduce the circumferential compression factors which would otherwise be introduced by reverse bending of the cup material from its original outer configuration to its reduced diameter inner cup configuration during movement of the piston.

Figure 11:
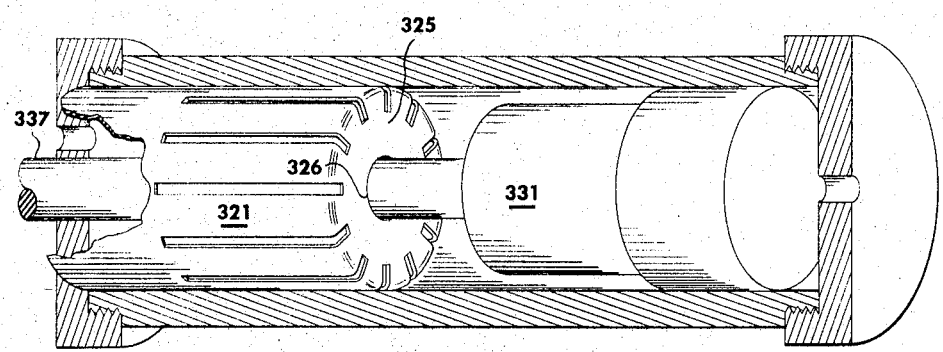
FIGURE 11 illustrates a further modified buffer arrangement employing a pull rod for the piston.

FIGURE 11 illustrates a modified buffer system arrangement employing a slotted cup 321 with a hole 326 formed in the end wall 325 thereof facing the piston 331, and the piston 331 has a pull rod (337) formed thereon or secured thereto. Thus, the arrangement permits the buffering action by exerting a pulling or tensile force or forces on the piston 331 with respect to the cup 321 and associated housing, as distinguished from the pushing or compressive applied forces which cause relative motion between the cup and piston in the embodiment of FIGURE 1. Otherwise, the action of the piston and cup in buffering the kinetic energy imparted thereto is substantially identical to the preceding described embodiments.

Figure 12:
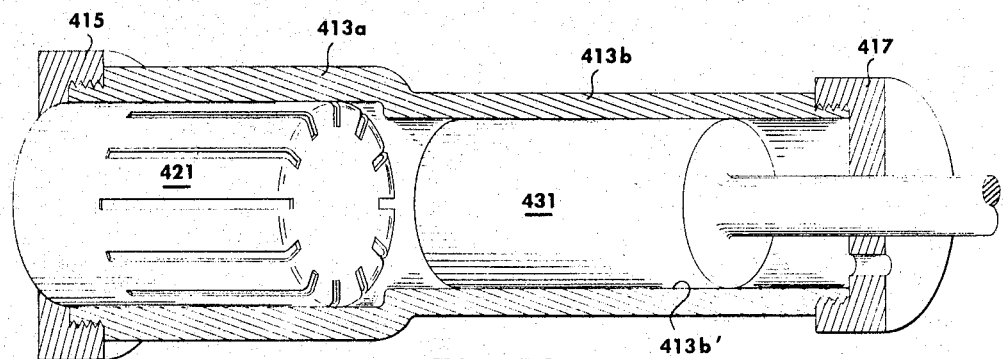
FIGURE 12 illustrates a further modified buffer arrangement employing a dual diameter cylinder inner wall.

FIGURE 12 illustrates a further modification in which the cylinder is formed with a piston guiding cylinder wall section 413b and an inner wall 413b' of smaller diameter than the inner cup-restraining cylinder wall 413a thereof, and the piston 431 is of constant diameter along its length, with the exception of the push rod externally extending portion thereof which might if desired also be of the same diameter as the remaining portion of the piston. As in the previous embodiments the cylinder may be closed at both ends by end caps 415 and 417. The differences in diameter of the cup 421 and piston 431 in this embodiment should be governed for most advantageous results by the considerations previously discussed with respect to the reduced diameter cup engaging section 35 of the piston 31 with respect to the cup 21 of the preceding described embodiment. It will be appreciated that the buffering action of this embodiment will be substantially identical to that previously described with respect to the preceding embodiments.

Figure 13:
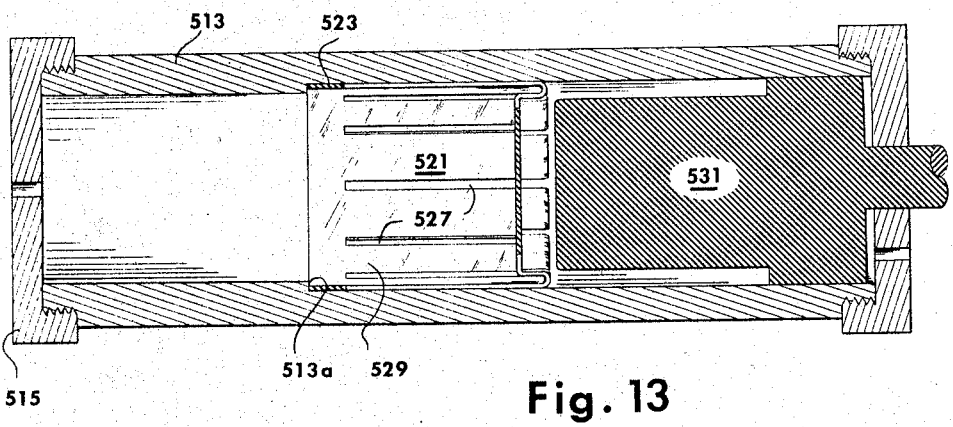
FIGURES 13 and 14 illustrate a further modified form of the buffer cup arrangement, in which the buffer cup is arranged for a longer energy absorbing stroke, FIGURE 14 showing the relative positions of the parts after completion of a normal energy absorption stroke.
Figure 14:
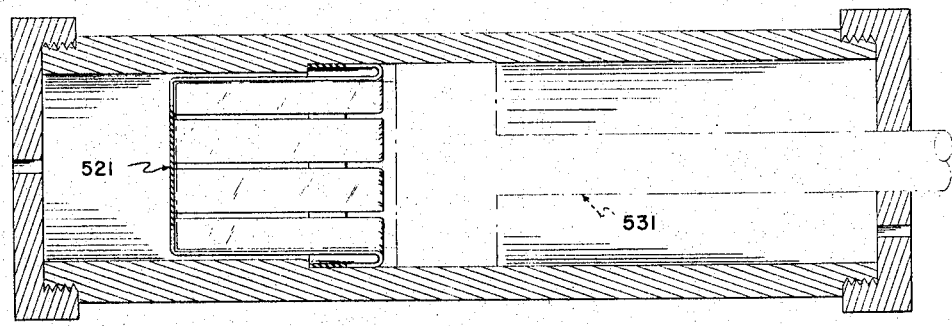

A further embodiment is illustrated at FIGURES 13 and 14, in which the total energy is absorbed along a longer stroke length of action between the cup 521 and piston 531, and the cup 521 is reverse formed to such an extent as to have its transverse end face extend through and beyond its anchored open end. To this end, the cup 521 is formed with slots 527 extending along substantially the entire length except for a small interconnecting end portion of the tubular side wall thereof, and at least of a length equal to or longer than the total anticipated stroke length of the piston while in engagement with the end wall of the cup 521. The cup 521 is suitably anchored against longitudinal movement at its open base end by engagement with an annular shoulder 513a formed on the inner wall of the cylinder 513. In this embodiment, the cup 521 is also predimpled as in the embodiment illustrated in FIGURE 10, and while the piston 531 is smaller than that shown in FIGURE 1, a piston arrangement such as shown in FIGURES 11 or 12 might also be employed, as will be apparent to those skilled in the art.

While the invention has been shown and described with respect to several illustrative physical embodiments and modes of practice thereof, it will be apparent to those skilled in the art that various modifications and improvements may be made without departing from the scope and spirit of the invention. Accordingly, it is to be understood that the invention is not to be limited by the particular illustrative embodiments, but only by the scope of the appended claims.

That which is claimed is:

1. A kinetic energy absorbing buffer arrangement comprising:
  a housing having a cylindrical piston-guiding and cup-confining opening,
  a buffer cup of relatively stiff ductile material capable of cold plastic flow to a substantially permanent deformation,
  said cup having a tubular outer annular side wall and a transversely extending end wall integrally connected to the outer side wall through a smooth curved bend,
  said cup being disposed within said cylindrical opening and having its annular side wall substantially complementary to said cylindrical opening,
  said annular side wall having a plurality of longitudinally extending slots formed therein at spaced intervals about the peripheral extent of the cup,
  a piston mounted for laterally guided axial movement within said cylindrical opening and having a cup-engaging longitudinal portion smaller in cross-sectional span than the internal cross-sectional span of the inner wall of said cup to enable said slotted cup wall to be in-rolled within itself by engagement and relative longitudinal movement of said transversely extending end wall by said piston,
  and anchor means for preventing sliding movement of said cup within the cylindrical opening in a direction away from said piston during depression of the transverse end wall and in-rolling of the outer annular wall of the cup to a generally tubular reverse turned inner wall form smaller in cross-section than the original outer said annular wall,
  said piston being mounted with one face thereof adjacent said cup end wall for laterally guided axial movement within said cylindrical opening in a direction toward said end wall of said cup to effect depression of the transverse end wall through a reverse bend to a generally tubular reverse turned inner wall form smaller in cross-section than the original outer said annular wall.

2. Apparatus according to claim 1 wherein said longitudinally extending slots extend from said annular side wall of said cup through said smooth curved bend and into a portion of said end wall, terminating at a radial position on said end wall within the effective radius of the cross-sectional configuration of said piston.

3. Apparatus according to claim 1 wherein said cup is open at its end opposite said transverse end wall and is secured to said housing adjacent said opposite open end.

4. Apparatus according to claim 1 wherein said anchor means comprises a shoulder stop in said cylindrical opening and engaging the end of said cup opposite said transverse end wall.

5. Apparatus according to claim 1 wherein said piston has a cup engaging longitudinal portion smaller in cross-sectional span than said cup side wall cross-sectional span by an amount equal to at least approximately eight times the thickness of the cup side walls to thereby permit a bend roll inner radius of at least approximately the thickness of the cup side wall on depression of the cup end wall by the piston.

6. Apparatus according to claim 1 wherein said slots are evenly spaced about said cup periphery.

7. Apparatus according to claim 1 wherein said slots are straight and parallel to one another and the longitudinal axis of the cup and each is of substantially constant width along the major extent of its length.

8. Apparatus according to claim 1 wherein said cup end wall has an opening therein, and a pull rod extending through said opening and connecting in pulling relation to said piston to cause axial displacement of said cup end wall and in-rolling of said side wall as a function of longitudinal movement of said piston and said transverse end wall.

9. An energy absorbing arrangement comprising:
a buffer element having a tubular portion connected to an end wall portion through a smooth curved bend,
a plurality of longitudinally extending slots formed in said tubular portion and spaced about the periphery of said tubular portion,
a piston mounted for sliding axial movement toward said buffer end wall and having an end-wall-engaging portion smaller in outer cross-section than the inner cross-section of said buffer element tubular portion for axial displacement of said buffer end wall and sequential segmental rolling of said slotted tubular portion in the direction of end wall movement,
axial stop means for stopping axial movement of said tubular portion relative thereto in the axial direction of motion of said piston toward said buffer end wall, and
an annular confining wall disposed about said slotted tubular portion of said buffer arrangement for preventing undesired outward buckling of the wall of said tubular portion during axial movement of said end wall and the concomitant sequential segmental inward roll bending of said tubular portion.

10. Apparatus according to claim 9 wherein said buffer element is formed of crystalline material capable of substantial cold flow under stress and reverse bending through a U-bend to a substantially permanent deformation.

11. Apparatus according to claim 9 wherein said buffer element has an annularly extending pre-formed smooth reverse bend connecting said tubular portion and said end wall portion and forming a predimpled end face substantially conforming to the cross-sectional shape and size of the facing head end of said piston.

12. Apparatus according to claim 9 further comprising a housing having a bore formed therein, the annular wall of said bore forming said confining wall for said buffer tubular portion, said piston being disposed within and slidably engageable for axial guidance with a portion of said bore.

13. Apparatus according to claim 12 wherein said housing has an air bleeder opening connecting with said bore.

References Cited by the Examiner

UNITED STATES PATENTS 3,209,864  10/1965  Boyd _____ 188—1
3,236,333  2/1966  Mitchell _____ 188—1

DUANE A. REGER, *Primary Examiner.*